US012042922B2

(12) United States Patent
Valentini

(10) Patent No.: US 12,042,922 B2
(45) Date of Patent: Jul. 23, 2024

(54) HAND-HELD POWER TOOL HAVING A TOOL HOUSING WITH AN ELONGATED LIGHT EMITTING DEVICE

(71) Applicant: Guido Valentini, Milan (IT)

(72) Inventor: Guido Valentini, Milan (IT)

( * ) Notice: Subject to any disclaimer, the term of this patent is extended or adjusted under 35 U.S.C. 154(b) by 0 days.

(21) Appl. No.: 18/373,409

(22) Filed: Sep. 27, 2023

(65) Prior Publication Data

US 2024/0025027 A1 Jan. 25, 2024

Related U.S. Application Data

(62) Division of application No. 17/668,557, filed on Feb. 10, 2022, now Pat. No. 11,801,593.

(30) Foreign Application Priority Data

Mar. 22, 2021 (EP) .................................... 21164052

(51) Int. Cl.
*B25F 5/02* (2006.01)

(52) U.S. Cl.
CPC .................................... *B25F 5/021* (2013.01)

(58) Field of Classification Search
CPC ...................................................... B25F 5/021
See application file for complete search history.

(56) References Cited

U.S. PATENT DOCUMENTS

| | | | |
|---|---|---|---|
| 2,309,060 | A | 1/1943 | Glaser |
| 5,277,620 | A | 1/1994 | Taylor |

(Continued)

FOREIGN PATENT DOCUMENTS

| | | | |
|---|---|---|---|
| EP | 3 117 964 | A1 | 1/2017 |
| JP | 2008264962 | A | 11/2008 |
| JP | 2018202536 | A | 12/2018 |

OTHER PUBLICATIONS

English language Abstract of JP2018202536A.
English language Abstract of EP3117964A1.
English language Abstract of JP2008264962A.

*Primary Examiner* — Evan P Dzierzynski

(74) *Attorney, Agent, or Firm* — Ware, Fressola, Maguire & Barber LLP

(57) ABSTRACT

The invention refers to a hand-held power tool (10), comprising a tool housing (12) having two housing shells (60, 62), a working element (30) protruding from the tool housing (12) and designed to perform a working movement (34) during an intended use of the power tool (10), and a motor (28) located inside the tool housing (12) and designed to drive the working element (30) to perform the working movement (34) during the intended use of the power tool (10). The power tool (10) has an elongated light emitting device (56) designed to emit light along its longitudinal extension (58) in a direction (86; 96) perpendicular to the longitudinal extension (58). The power tool (10) comprises an elongated holding arrangement (200) made of a transparent material, having an internal space (202) for receiving and surrounding the elongated light emitting device (56). The elongated holding arrangement (200) has at least two attachment elements (204) adapted for being clamped between the two housing shells (60, 62) of the tool housing (12) during the tool housing assembly for attachment of the at least one elongated holding arrangement (200) to the tool housing (12).

20 Claims, 6 Drawing Sheets

(56) References Cited

U.S. PATENT DOCUMENTS

| | | | | |
|---|---|---|---|---|
| 6,465,951 | B1 | 10/2002 | Krafcik | |
| 6,591,049 | B2 | 7/2003 | Williams | |
| 6,739,744 | B2 | 5/2004 | Williams | |
| 7,330,632 | B1 | 2/2008 | Buelow | |
| 9,033,536 | B2 | 5/2015 | Shen | |
| 10,174,934 | B2 * | 1/2019 | Padget | F21V 23/04 |
| 10,525,582 | B2 | 1/2020 | Qiu | |
| 10,799,997 | B2 * | 10/2020 | Schadow | B25F 5/02 |
| 2005/0047878 | A1 | 3/2005 | Riley | |
| 2006/0262519 | A1 | 11/2006 | Hirschburger et al. | |
| 2008/0122302 | A1 | 5/2008 | Leininger | |
| 2010/0328929 | A1 * | 12/2010 | Lutz | B25F 5/021 362/119 |
| 2011/0100661 | A1 | 5/2011 | Wei | |
| 2012/0106133 | A1 * | 5/2012 | Roehm | B25B 23/18 362/119 |
| 2013/0003359 | A1 | 1/2013 | Dixon et al. | |
| 2016/0170119 | A1 | 6/2016 | Hao | |
| 2017/0357040 | A1 | 12/2017 | Liu | |
| 2018/0022274 | A1 | 1/2018 | Kincade et al. | |
| 2018/0085901 | A1 * | 3/2018 | Leininger | B25B 23/18 |
| 2019/0004230 | A1 | 1/2019 | Tissot | |

* cited by examiner

HAND-HELD POWER TOOL HAVING A TOOL HOUSING WITH AN ELONGATED LIGHT EMITTING DEVICE

CROSS REFERENCE TO RELATED APPLICATIONS

This application is a divisional of, and claims benefit to, application Ser. No. 17/668,557, filed 10 Feb. 2022, which is hereby incorporated by reference in its entirety.

BACKGROUND OF THE INVENTION

1. Field of Invention

The present invention refers to a hand-held power tool, comprising

- a tool housing,
- a working element protruding from the housing and designed to perform a working movement during an intended use of the power tool, and
- a motor located inside the housing and designed to drive the working element to perform the working movement during the intended use of the power tool.

The power tool may be operated electrically or pneumatically. To this end, the motor is an electric motor or a pneumatic motor. The electric power tool may be supplied with electric energy by a detachable battery located at least partially inside or otherwise attached to the tool housing or by means of a cable connection to a mains power supply. One or more gear members may be located functionally between the motor and the working element. The one or more gear members are located inside the tool housing. The one or more gear members may comprise but are not limited to at least one of a bevel gear arrangement, a coaxial reduction gear arrangement, and an epicyclic or planetary gear arrangement. The hand-held power tool may be but is not limited to at least one of a rotary drill, a hammer drill, a cordless screwdriver, a polishing machine, a sanding machine, and a grinding machine.

The working element of a drill or cordless screwdriver is preferably a drill chuck to which a drill bit, screwdriver bit or the like may be releasably attached, for instance by means of a clamping mechanism or a coupling mechanism. The drill chuck performs a purely rotational working movement. Additionally, in the case of a drill hammer, a linear back-and-forth movement in the direction of a longitudinal extension of a drill bit attached to the drill chuck, may the drill chuck may superimpose the rotational movement.

The working element of a polishing or sanding machine is preferably embodied as a backing pad. A polishing member (e.g. a foam pad, wool pad, micro-fibre pad, or the like) or sanding member (e.g. a sanding paper, sanding fabric, abrasive pad, or the like) may be releasably attached to a bottom surface of the backing pad, for instance by means of hook-and-loop fastening members. The backing pad of a polishing machine may perform a purely rotational, a random-orbital or a gear-driven working movement. The backing pad of a sanding machine may perform a random-orbital or an eccentric working movement.

The working element of a grinding machine is preferably embodied as a coupling member to which a grinding disc can be releasably attached, for instance by means of a coupling mechanism or a screw-nut connection. The coupling member performs a purely rotational working movement.

2. Brief Description of Related Art

It is well-known in the prior art to provide one or more LEDs at the front of a tool housing of a hand-held power tool, the LEDs emitting white light focused on a working area during intended use of the power tool. The idea is to illuminate the working area in order to allow the user to use the power tool also in spaces and on working surfaces of work pieces which are only poorly illuminated with room light or sun light (e.g. US 2006/262 519 A1 and US 2013/003 359 A1).

Furthermore, it is well-known in the prior art to provide one or more LEDs in a tool housing of a hand-held power tool, the LEDs serving as control lights and emitting light, possibly in different colours, depending on a current operation status (e.g. a current charge state of a battery) of the power tool (e.g. JP 2008 264 962 A). For instance, an LED may be provided in the tool housing, which emits red light if the charge state of a battery of the power tool falls below 25%. The LED(s) provided as control lights in the tool housings of known power tools merely provide a small light spot with very restricted dimensions. Due to its small dimensions, the control lights are often not clearly and immediately visible to the user of the power tool. Even if a plurality of LEDs is provided in the tool housing and even if they are designed to emit light of different colours, the overall appearance of such control lights is not very appealing to the user of the power tool. The design aspects are completely neglected with LED control lights in known power tools. The main focus is directed towards functional as well as technical aspects and to a realization of the control lights as cheap as possible.

JP 2018-202 536 A discloses a hand-held power tool in the form of a driving tool for ejecting a fastener (a U-shaped staple needle). An elongated light guide is externally attached to a tool housing and emits light along its longitudinal extension in a direction that is essentially perpendicular to the longitudinal extension. The light guide has a cross section with an engaging portion integrally formed with the light guide. The engaging portion interacts with a respective holding portion of the tool housing in order to directly attach the light guide, in particular to have the engaging portion clamped between two housing shells of the tool housing. However, the engaging portion making an integral part of the light guide may have a negative impact on the light propagation within the light guide and on the decoupling of light from the light guide. Thus, the efficiency of the light guide is not very good. Further, the light guide of the known power tool is exposed to mechanical, chemical and/or meteorological influences which might damage the light guide.

It is, therefore, an object of the present invention to provide a hand-held power tool which combines the effort of optical communication of the current operation status of the power tool with new and innovative design aspects, and in which an elongated light emitting device can be easily mounted to the tool housing. In particular, it is an object of the invention to provide for control lights which clearly indicate to the user the current operation status of the power tool and which are immediately and under all circumstances clearly visible to the user. It is a further object to provide for a fast and easy mounting of an elongated light emitting device preferably in a detachable manner. It is yet another object to provide for a safe and reliable protection of the elongated light emitting device attached to the tool housing.

SUMMARY OF THE INVENTION

In order to solve these and other objects, a hand-held power tool comprising the features of the independent claims is suggested. In one embodiment of the invention it is suggested that the power tool further comprises at least one elongated light emitting device having a longitudinal extension and located at least partially on an external surface of the tool housing, wherein the at least one elongated light emitting device is designed to emit light along at least part of its longitudinal extension in a direction that is essentially perpendicular to the longitudinal extension of the elongated light emitting device.

In another embodiment of the invention it is suggested that that the at least one elongated light emitting device comprises one of an electroluminescent wire having a longitudinal extension and designed to emit light along at least part of its longitudinal extension in a direction that is essentially perpendicular to its longitudinal extension, an optical light guide having a longitudinal extension, and a light source designed to emit light and to couple at least part of the emitted light into the optical light guide, wherein the optical light guide is designed to couple out at least part of the coupled-in light along at least part of its longitudinal extension in a direction that is essentially perpendicular to its longitudinal extension, and a diffusing lens having a longitudinal extension, and a plurality of discrete light sources located spaced apart from each other along the longitudinal extension of the diffusing lens and designed to emit light through the diffusing lens in a direction that is essentially perpendicular to the longitudinal extension of the diffusing lens, wherein the diffusing lens is designed to scatter the light from the discrete light sources such that a light emitting side of the diffusing lens located opposite to the light sources and extending along at least part of the longitudinal extension of the diffusing lens is uniformly illuminated by the scattered light, and wherein at least one light source is designed to emit light of at least two different colours and/or the electroluminescent wire or at least one light source is designed to emit light continuously or intermittently at a certain frequency, and wherein at least one of the colour of the light emitted by the at least one light source and whether the electroluminescent wire or the at least one light source emits light continuously or intermittently and a frequency of the intermittently emitted light depends on a current operation status of the hand-held power tool, comprising one or more of:

a pressure with which a user presses the working element against a working surface of a work piece during intended use of the hand-held power tool, a type of working movement the working element currently performs during intended use of the hand-held power tool, and a number of rotations per time unit the working element or the motor currently performs during intended use of the hand-held power tool.

In yet another embodiment of the invention it is suggested that the power tool further comprises at least one elongated holding arrangement made of a transparent material and adapted for receiving and surrounding at least part of the elongated light emitting device and for being attached to the tool housing.

The invention suggests to provide one or more elongated light emitting devices on an external surface of the tool-housing, the light emitting devices emitting light along at least part of their longitudinal extensions, and, therefore, providing for a much larger illuminated surface. In particular, the illuminated surface may extend over more than half the length of the tool housing and/or around more than half the external circumference of the tool housing. Due to the longitudinal extension of the at least one light emitting device, a user of the power tool has almost no chance to cover the entire illuminated surface with his hands when holding the power tool during its intended use. Independent from how the user is holding the power tool, he will always be able to see at least part of the light emitted by the elongated light emitting device. Besides, the at least one elongated light emitting device located on the external surface of the tool housing with the resulting elongated illuminated surface and its longitudinal extension, gives the manufacturer of power tools the chance to introduce a completely new and innovative design of his power tools. This may be the case, for instance, if the longitudinal extension of the at least one elongated light emitting device follows a major design line of the tool housing. Furthermore, a corporate identity can be realized by a certain type of light emitting device (e.g. location on the tool housing, form, extension of the light emitting device, light colour emitted by the light emitting device, etc.) with which all power tools of a certain manufacturer are equally provided.

In contrast to conventional light sources, the elongated light emitting device creates and emits light without reaching high operating temperatures. This has the advantage that no specific heat sinks need to be provided in the power tool and that the elongated light emitting device can be located close to and even be directly attached to surfaces (e.g. an external surface of the tool housing) made of plastic material. Furthermore, due to the low operating temperatures of the elongated light emitting device, it can be attached to the tool housing by means of conventional off-the-shelf glues.

The at least one elongated light emitting device is not directly attached to the tool housing but rather indirectly by means of the at least one elongated holding arrangement, which in turn is attached to the tool housing. By means of the elongated holding arrangement, the elongated light emitting device can be easily and securely attached to the tool housing. The elongated light emitting device can be easily located inside an internal space of the elongated holding arrangement, when it is separate from the tool housing, and then the assembly of the two components (light emitting device and holding arrangement) can be attached to the tool housing. Due to the transparency of the elongated holding arrangement, light emitted by the elongated light emitting device simply transmitted through the elongated holding arrangement, essentially without any losses. Additionally, the elongated holding arrangement may provide for a protection of the elongated light emitting device received therein.

According to a preferred embodiment of the invention, it is suggested that the at least one elongated holding arrangement has an O-shaped or U-shaped cross section, wherein the at least one elongated light emitting device is received inside an internal space of the O-shape or U-shape. In the case of a U-shaped cross section of the elongated holding arrangement it can be attached to the tool housing such that the opening between the two approximately parallel legs of the U-shape faces towards the tool housing, so that the internal space of the elongated holding arrangement is closed by the U-shape of the elongated holding arrangement in cooperation with the outside of the tool housing. This results in an overall protection of the elongated light emitting device to all sides.

Advantageously, the tool housing comprises at least two housing shells, which are attached to each other along a butt joint during tool housing assembly in order to form the tool housing, and the at least one elongated holding arrangement has at least two attachment elements adapted for being clamped between two housing shells during the tool housing assembly. The attachment elements are preferably spaced apart from each other along the longitudinal extension of the elongated holding arrangement.

Clamping the elongated holding arrangement between two housing shells has the advantage that by disassembling the tool housing and separating the two housing shells from each other, the elongated holding arrangement can be easily separated from the tool housing, e.g. for replacing the elongated light emitting device. Furthermore, the clamping step can be easily integrated into a conventional tool housing assembly process. No additional attachment steps e.g. for gluing the elongated holding arrangement to the tool housing or the like, have to be added to the tool housing assembly process. The housing shells may be attached to each other by means of glue, screws, snap-in connections or the like.

Usually the butt joint between two housing shells forms a groove in which the elongated holding arrangement, clamped between the two housing shells, can be located. This has the advantage that the elongated holding arrangement does not protrude by much beyond the external surface of the tool housing bordering the groove, thereby protecting the assembly of the two components from damage. Furthermore, the butt joint usually reflects a major design line of the tool housing. Locating the at least one elongated light emitting device along the butt joint further emphasizes the major design line, when the light emitting device emits light.

It is suggested that the at least one elongated holding arrangement is made of a transparent plastic material, in particular PC or PMMA. Plastic material is particularly adapted for use with the elongated holding arrangement due to its high durability, good resistance to external influences and to breakage, its light weight, and its simple, fast and inexpensive production.

It is further suggested that the at least one elongated holding arrangement is made of a rigid material which before attachment to the tool housing has a rigid three dimensional form corresponding to the three dimensional form of a part of the tool housing to which the at least one elongated holding arrangement is to be attached. This facilitates the assembly of the elongated holding arrangement considerably.

The elongated holding arrangement can be made of a coloured material, in order to give the light emitted by the elongated light emitting device a desired colour. Preferably, the at least one elongated holding arrangement is made of a material and has internal and/or external light transmission surfaces which impose no light scattering effect on the light emitted by the at least one elongated light emitting device and passing through the at least one elongated holding arrangement. In particular, the material of the elongated holding arrangement has not light scattering particles therein. Further, the internal and/or external light transmission surfaces of the elongated holding arrangement have no light scattering structure, for example a matted or frosted surface. Scattering of light is considered to be an uncontrollable light diffusion. It is however possible, that the internal and/or external light transmission surfaces of the elongated holding arrangement have light directing elements (e.g. prisms or cylinder lenses or sections thereof) which direct the light passing through the at least one elongated holding arrangement in a controllable manner towards a desired direction.

According to a preferred embodiment of the present invention, it is suggested that the at least one elongated light emitting device comprises one of

- an electroluminescent wire having a longitudinal extension and designed to emit light along at least part of its longitudinal extension in a direction that is essentially perpendicular to its longitudinal extension,
- an optical light guide having a longitudinal extension, and a light source designed to emit light and to couple at least part of the emitted light into the optical light guide, wherein the optical light guide is designed to couple out at least part of the coupled-in light along at least part of its longitudinal extension in a direction that is essentially perpendicular to its longitudinal extension, and
- a diffusing lens having a longitudinal extension, and a plurality of discrete light sources located spaced apart from each other along the longitudinal extension of the diffusing lens and designed to emit light through the diffusing lens in a direction that is essentially perpendicular to the longitudinal extension of the diffusing lens, wherein the diffusing lens is designed to scatter the light from the discrete light sources such that a light emitting side of the diffusing lens located opposite to the light sources and extending along at least part of the longitudinal extension of the diffusing lens is uniformly illuminated by the scattered light.

An electroluminescent (or EL) wire comprises a thin copper wire coated by an electroluminescent material (e.g. phosphor or the like) that produces light through electroluminescence when an alternating current at relatively high frequencies is applied to it. An EL wire produces a 360° homogeneous unbroken line of visible light in a certain colour. A protecting sheathing around the electroluminescent material which is preferably made of a plastic or rubber material can influence the wavelength of the light emitted by the EL wire. Thus, the colour of the light emitted by the EL wire can be set by using a sheathing made of a certain plastic material or containing certain particles. The EL wire has a respectively thin diameter which makes it highly flexible.

For attachment of the EL wire on/at the tool housing, the EL wire may be glued to the external surface of the tool housing or affixed thereto in any other way, e.g. by clamping the EL wire into a groove formed on the external surface of the tool housing. Alternatively, a separate transparent holding arrangement may be used. To this end, according to an embodiment of the invention, it is suggested that the power tool further comprises at least one elongated holding arrangement made of a transparent material and adapted for receiving and surrounding at least part of the elongated light emitting device and for being attached to the tool housing.

After attachment, the EL wire simply has to be electrically connected to a respective driver stage of a control unit of the power tool located in the tool housing. To this end, one or more holes can be provided in the tool housing through which the EL wire is led into the housing (and electrically connected inside the housing) or through which one or more electric cables are led out of the housing to the EL wire (and electrically connected outside the housing).

Preferably, at least on part of one side of the EL wire facing the tool housing a reflective surface is provided. The reflective surface may be in the form of a coating or a foil made of a reflective material, e.g. metal. The reflective surface may be applied onto an outer boundary surface of the EL wire and/or onto a part of the external surface of the tool housing adjacent to the EL wire and/or onto a part of the elongated holding arrangement. The reflective surface directs light which is emitted toward the tool housing in the opposite direction away from the tool housing. This significantly increases the efficiency of the EL wire.

The use of an optical light guide has the advantage that the light source may be located distant from the illuminated surface at the outside of the tool housing. In particular, the light source can be located inside the tool housing where it is protected from dust, humidity, etc. Furthermore, an electric connection to a battery or a power supply unit can be achieved more easily if the light source is located inside the tool housing near the battery or the power supply unit.

The light source is preferably located inside the tool housing. One or more holes can be provided in the tool housing and/or in the elongated holding arrangement, through which the light source may emit light towards the optical light guide located outside of the tool housing. Alternatively, one or both opposing ends of the optical light guide may be led through the hole into the inside of the tool housing near the light source. Preferably, the light source couples light into the light guide at one or both opposing end surfaces of the light guide. One or more light sources may couple light into one end surface of the optical light guide.

Preferably, the light coupled into the optical light guide is transmitted within the light guide along the longitudinal extension of the light guide by means of total internal reflection (TIR) at external boundary surfaces of the optical light guide. In general, TIR takes place at the boundary between two transparent media when a ray of light in a medium of higher index of refraction (i.e. the optical light guide) approaches another medium (i.e. the surrounding air) at an angle of incidence greater than the critical angle. The critical angle depends on the material of the optical light guide and on the wavelength (i.e. colour) of the light.

Alternatively or additionally, it is suggested, that the optical light guide is made of a glass material, a transparent plastic material, in particular of an acrylic material like polymethylmethacrylate (PMMA) or of polycarbonate (PC), or a transparent rubber material. These materials have a good optical clarity, good mechanical properties, and very little natural scintillation response to ionizing radiation. Impurities in the rubber material may be used for intentionally coupling out the light transmitted through the light guide by means of TIR in the direction essentially perpendicular to the longitudinal extension of the elongated light emitting device.

The optical light guide may comprise decoupling elements located along at least part of the longitudinal extension of the optical light guide, wherein the decoupling elements are designed to couple out at least part of the coupled-in light in a direction that is essentially perpendicular to the longitudinal extension of the optical light guide. The decoupling elements act as virtual light sources through which the light is coupled out of the optical light guide in the direction essentially perpendicular to the longitudinal extension of the light guide.

The decoupling elements can comprise prisms, inside the optical light guide or on an outer boundary surface of the light guide. A roughening (matting or frosting) on light reflecting surfaces of the decoupling elements and/or on the outer boundary surfaces of the light guide through which the light is coupled out of the light guide can provide for an additional scattering and homogenisation of the out-coupled light.

Advantageously, the decoupling elements are designed and located at or in the optical light guide in such a manner as to couple out the at least part of the coupled-in light into a 180°-space to one side of the optical light guide, preferably towards the environment surrounding the tool housing. This embodiment can significantly enhance the efficiency of the elongated light emitting device. Almost all the light coupled into the light guides is coupled out of the light guide in a direction in which it can be seen by an observer. Almost no light is coupled out of the light guides towards the tool housing, where it would not be seen by an observer.

In order to further enhance the efficiency of the elongated light emitting device, it is suggested that a bundling optic is arranged between the light source and a light input end surface of the optical light guide, into which the light source couples at least part of its emitted light, wherein the bundling optic is designed to bundle at least part of the light emitted by the light source and to couple a larger proportion of the emitted light into the optical light guide than if the bundling optic was not present. Conventional light sources emit light in a rather large three-dimensional space. For example, an incandescent lamp emits light into almost the entire 360°-space surrounding the lamp and an LED emits light into a 180°-space adjacent to a light emitting surface of the LED. The bundling optic focuses as much light as possible emitted by the light source onto the input surface of the optical light guide. The bundling optic can make an integral part of the light source and/or of the optical light guide.

Preferably, the at least one light source is embodied as a semiconductor light source, in particular as a light emitting diode (LED). Such light sources are small and consume very little electricity. They are available in a variety of versions, including different power ranges (brightness) and colours of the emitted light. Such light sources can be easily integrated into existing electronic components inside the tool housing.

The elongated light emitting device may have almost any cross sectional form, including but not limited to: square, rectangular, and polygonal. However, according to a preferred embodiment of the present invention, the electroluminescent wire or the optical light guide has a round or oval cross section. Such electroluminescent wires emit light particularly homogenously. Such optical light guides propagate the in-coupled light by means of TIR particularly efficiently. No so-called hot spots (areas in which light rays accumulate and thus provide a particularly high brightness) are formed in such electroluminescent wires or optical light guides.

According to yet another preferred embodiment of the present invention, it is suggested that the elongated light emitting device comprises an elongate diffusing lens with a longitudinal extension. The diffusing lens may have a round, oval, square, rectangular or polygonal cross section. Preferably, the diffusing lens has a cross sectional form of a segment of such a cross section, in particular of a semicircle. The diffusing lens may be made of glass, a transparent plastic material or a rubber material. The diffusing lens may have any colour in order to give the emitted light a desired colour. The diffusing lens is preferably made of a solid material. It may have a diffusing structure, e.g. a micro structure on one or more of its external surfaces through which the light is transmitted. A plurality of discrete light sources, preferably in the form of LEDs, are arranged spaced apart from each other along the longitudinal extension of the diffusing lens so that they emit light substantially transversely to the longitudinal extension of the diffusing lens therethrough. When passing through the diffusing lens, the light emitted by the LEDs is scattered to such an extent that the light emitting side of the diffusing lens, which preferably extends opposite the light sources over at least part of the longitudinal extension of the diffusing lens, is uniformly illuminated. On the light emitting side, the discrete light sources that emit light through the diffusing lens are no longer recognisable as such. Instead, the light emitting side of the diffusing lens emits a homogeneous light distribution.

According to another preferred embodiment of the invention it is suggested that the tool housing comprises at least two housing shells, which are attached to each other along a butt joint in order to form the tool housing, wherein the at least one elongated light emitting device extends along at least part of the butt joint. The housing shells may be attached to each other by means of glue, screws, snap-in connections or the like. Usually the butt joint forms a groove in which the elongated light emitting device can be directly fixed (e.g. by means of a glue or by clamping) or indirectly attached (e.g. by means of the holding arrangement). The presence of a groove and the location of the elongated light emitting device therein has the advantage that the light emitting device does not protrude beyond the external surface of the tool housing, thereby protecting the light emitting device from damage. Furthermore, the butt joint usually reflects a major design line of the power tool housing. Locating the at least one elongated light emitting device along or within the butt joint further emphasizes the major design line of the tool, when the light emitting device emits light.

According to yet another preferred embodiment of the invention it is suggested that the tool housing comprises at least one embossed character and/or at least one embossed symbol, wherein the at least one elongated light emitting device is located in at least part of the embossed character and/or the embossed symbol. The embossed character may comprise one or more letters or numbers. It may reflect the name of the manufacturer of the power tool and/or the name of the power tool.

Further, it may reflect hints for use of the power tool, e.g. “I/O” for indicating the positions of an on/off switch or numbers from “1” to “9” for indicating different motor speeds. The embossed symbol may comprise a graphic symbol relating to the manufacturer of the tool or to the tool itself or the like. By locating the elongated light emitting device in at least part of the embossed character and/or the embossed symbol these can be emphasized for better perception by an observer. Additionally, the informational aspect of the light emitted by the elongated light emitting device (i.e. information on the current operating status of the power tool) can be combined with a design aspect emphasizing the character and/or symbol embossed into the tool housing.

According to a preferred embodiment, the light sources associated to the light guide or to the diffusing lens are designed to emit light of at least two different colours. The light sources may, for instance, be embodied as RGB-LEDs. Similarly, the power tool may comprise at least two electroluminescent wires or light sources which emit light of different colours. Preferably, the colour of the light emitted by the electroluminescent wires or the light sources depends on a current operation status of the hand-held power tool, comprising but not limited to one or more of:

- a pressure with which a user presses the working element against a working surface of a work piece during intended use of the hand-held power tool,
- a current charge state of a battery of the hand-held power tool,

- a type of working movement the working element currently performs during intended use of the hand-held power tool,
- a number of rotations per time unit the working element currently performs during intended use of the hand-held power tool,
- an operating temperature inside the tool housing,
- whether the motor is rotating or not,
- whether a battery of the hand-held power tool is in proper electric contact with the electrical components of the power tool or not,
- whether the motor is in overload during intended use of the hand-held power tool, and
- an increase or a decrease of the number of rotations the working element or the motor currently performs during intended use of the hand-held power tool.

It is suggested that the hand-held power tool comprises means for manually setting the colour of the light emitted by the elongated light emitting device by a user of the power tool. The means for manually setting the colour of the emitted light may comprise a switch accessible by the user of the power tool or other people, or a radio receiver for receiving respective control signals containing information about a colour to be set from a mobile device, e.g. from a mobile phone or a tablet PC on which a dedicated application or computer program is executed which permits the user or other people to set the colour of the emitted light to a desired value. To this end, the user, i.e. the client of the manufacturer of the power tool, can set the colour of the light emitted by the elongated light emitting device located on the external surface of the tool housing to an individual preferred value.

According to another a preferred embodiment, the electroluminescent wire or the light source is designed to emit light continuously or intermittently at a certain frequency. Preferably, whether the electroluminescent wire or the light source emits light continuously or intermittently and/or the frequency of the intermittently emitted light depends on a current operation status of the hand-held power tool, comprising but not limited to one or more of:

- a pressure with which a user presses the working element against a working surface of a work piece during intended use of the hand-held power tool,
- a current charge state of a battery of the hand-held power tool,
- a type of working movement the working element currently performs during intended use of the hand-held power tool,
- a number of rotations per time unit the working element currently performs during intended use of the hand-held power tool,
- an operating temperature inside the tool housing,
- whether the motor is rotating or not,
- whether a battery of the hand-held power tool is in proper electric contact with the electrical components of the power tool or not,
- whether the motor is in overload during intended use of the hand-held power tool, and
- an increase or a decrease of the number of rotations the working element or the motor currently performs during intended use of the hand-held power tool.

The inventor has in particular contemplated the following ways of indicating an operating status of the power tool to a user:

- a battery of the power tool is inserted into the tool housing and properly electrically connected to electronic components of the power tool: the light emitted by the elongated light emitting device turns from off to on and then—possibly after a certain period of time—back from on to off again, the motor of the power tool is running: the light emitted by the elongated light emitting device is on, the charging status of a battery of the power tool is low: the light emitted by the elongated light emitting device flashes with a frequency of 1 Hz, the motor of the power tool is overloaded: the light emitted by the elongated light emitting device flashes with a frequency of 3 Hz, the speed of the motor of the power tool is increased: the light emitted by the elongated light emitting device turns brighter for a given period of time, and the speed of the motor of the power tool is decreased: the light emitted by the elongated light emitting device turns darker for a given period of time.

The desired object of providing for control lights of a hand-held power tool which control lights clearly indicate to the user of the power tool the current operation status of the power tool and which are immediately and under all circumstances clearly visible to the user, can also be solved by a hand-held power tool of the above identified kind, where venting openings are provided in the tool housing allowing heat from the motor and other components located inside the tool housing to escape to the environment, and where at least one light source is located inside the tool housing, wherein the at least one light source is adapted to emit light through the venting openings to the outside of the tool housing. This provides for a back-light effect to the venting openings of the tool housing. As described above, the emitted light can serve for indicating a current operation status of the power tool to the user. The emitted light can have different colours preferably depending on the current operation status of the power tool. The light can also be emitted continuously or intermittently preferably depending on the current operation status of the power tool.

BRIEF DESCRIPTION OF THE DRAWING

Further features and advantages of the present invention may become more apparent from the following description referring to the figures showing preferred embodiments of the invention. It is emphasized that the features shown in the figures may each be essential for the invention on its own. Likewise, each of the features shown in the figures may be combined with any other feature(s) shown in the figures in any possible combination even if that combination is not explicitly mentioned in the description or shown in the figures. The figures show.

DETAILED DESCRIPTION OF THE BEST MODE OF THE INVENTION

Figure 1:
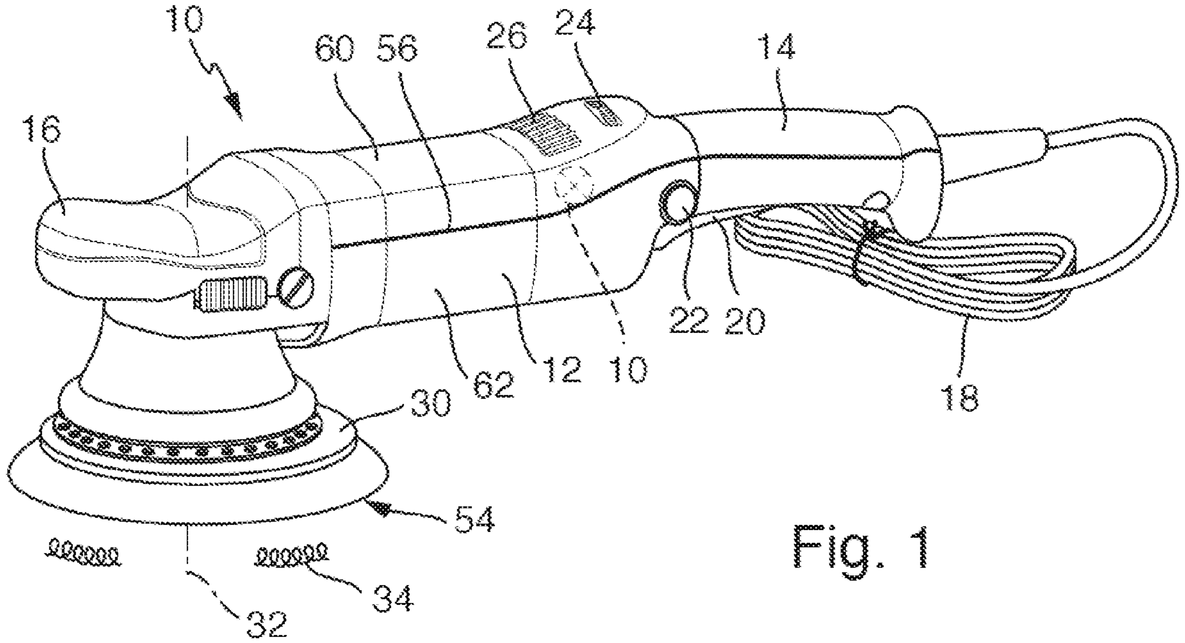
FIG. 1 a preferred first embodiment of a hand-held power tool according to the present invention.
Figure 2:
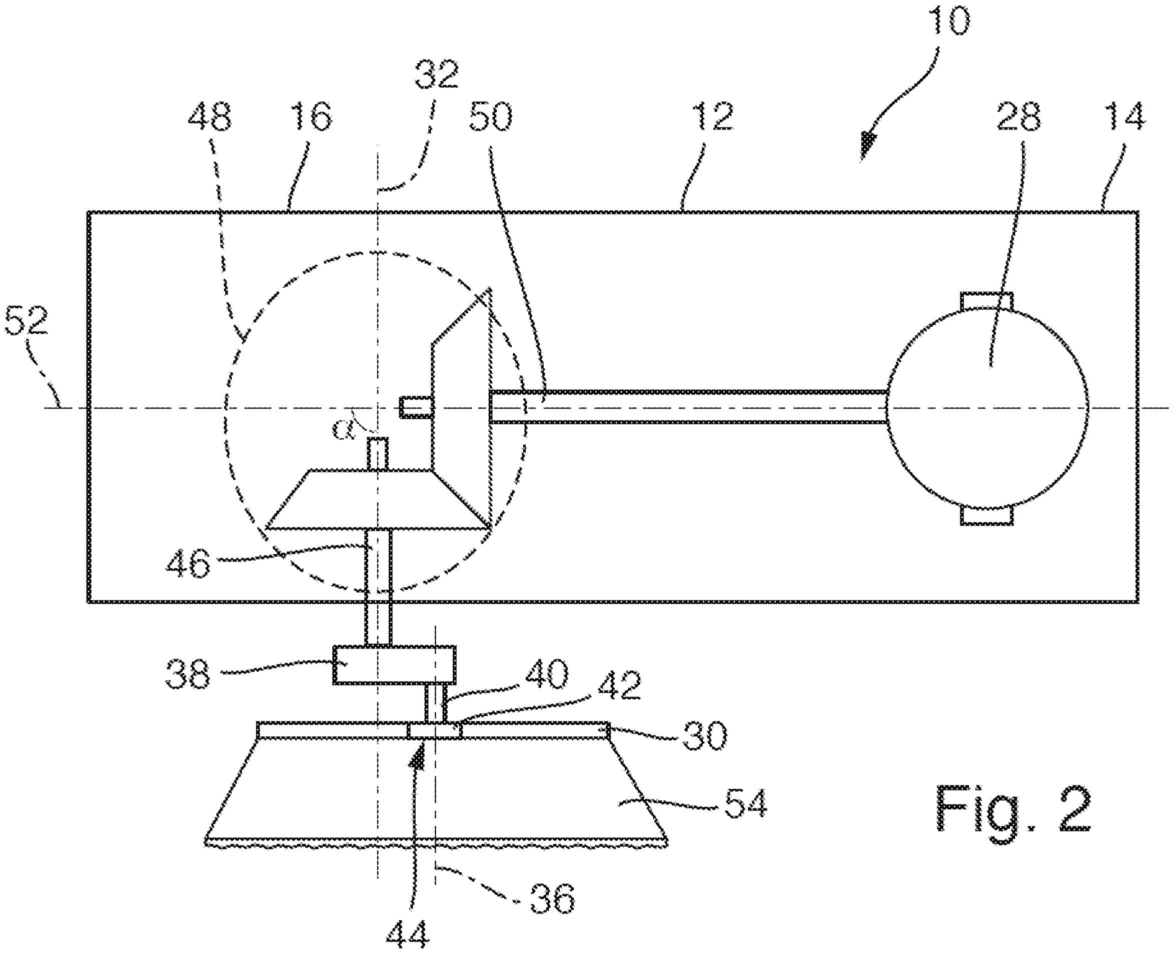
FIG. 2 a schematic longitudinal section through the power tool of FIG. 1

FIG. 1 shows an example of a hand-held electric power tool 10 according to the present invention in a perspective view. FIG. 2 shows a schematic longitudinal section through the power tool 10 of FIG. 1. The power tool 10 is embodied as a random orbital polishing machine (or polisher). The polisher 10 has a tool housing 12, essentially made of a plastic material. The tool housing 12 comprises a handle 14 at its rear end and a grip element 16 at its front end. A user of the power tool 10 may hold the power tool 10 with one hand at the handle 14 and with the other hand apply a certain amount of pressure on the grip element 16 during the intended use of the power tool 10.

An electric power supply line 18 with an electric plug at its distal end exits the tool housing 12 at the rear end of the handle 14. At the bottom side of the handle 14, a switch 20 is provided for activating and deactivating the power tool 10, i.e. selectively turning it on and off. The switch 20 can be continuously held in its activated position by means of a push button 22. The power tool 10 can be provided with adjustment means 24, for example in the form of a knurled wheel, for setting the rotational speed of the tool's electric motor 28 (see FIG. 2) to a desired value. The tool housing 12 can be provided with cooling or venting openings 26 for allowing heat from electronic components and/or the electric motor 28 both located inside the tool housing 12 to dissipate into the environment and/or for allowing cooling air from the environment to enter into the tool housing 12.

As can be seen from FIG. 2, the power tool 10 has an electric motor 28. The electric motor 28 is preferably of the brushless type. Instead of the connection of the power tool 10 to a mains power supply by means of the electric cable 18, the power tool 10 could additionally or alternatively be equipped with a rechargeable or exchangeable battery (not shown) located at least partially inside the tool housing 12. In that case the electric energy for driving the electric motor 28 and for operating the other electronic components of the power tool 10 would be provided by the battery. If, despite the presence of a battery, the electric cable 18 was still present, the battery could be charged with an electric current from the mains power supply before, during or after operation of the power tool 10. The presence of a battery would allow the use of an electric motor 28 which is not operated at the mains power supply voltage (230V in Europe or 110V in the US and other countries), but rather at a reduced voltage of, for example, 12V, 24V, 36V or 42V depending on the voltage provided by the battery.

The power tool 10 has a working element in the form of a plate-like backing pad 30 rotatable about a first rotational axis 32. In particular, the backing pad 30 of the tool shown in FIG. 1 performs a random orbital movement 34. With the random orbital movement 34 the backing pad 30 performs a first rotational movement about the first rotational axis 32. Spaced apart from the first rotational axis 32, a second rotational axis 36 (see FIG. 2) is defined, about which the backing pad 30 is freely rotatable independently from the rotation of the backing pad 30 about the first rotational axis 32. The second axis 36 runs through the balance point of the backing pad 30 and parallel to the first rotational axis 32. The random orbital movement 34 is realized by means of an eccentric element 38 which is directly or indirectly driven by the motor 28 and which performs a rotation about the first rotational axis 32. A fulcrum pin 40 is held in the eccentric element 38 and guided freely rotatable in respect to the eccentric element 38 about the second rotational axis 36. An attachment member 42 (e.g. an enlarged head portion) of the fulcrum pin 40 is inserted into a recess 44 provided in a top surface of the backing pad 30 and attached thereto in a releasable manner, e.g. by means of a screw (not shown) or by means of magnetic force. The eccentric element 38 may be directly attached to a driving shaft 46 of the power tool in a torque proof manner.

One or more gear members may be located functionally between the motor 28 and the driving shaft 46 of the power tool 10. In the embodiment shown in FIG. 2, a gear member in the form of a bevel gear arrangement 48 is provided between the motor 28 and the driving shaft 46. The bevel gear arrangement 48 comprises two meshing bevel gears, one fixedly attached to a motor shaft 50 of the motor 28 and the other fixedly attached to the driving shaft 46. The bevel gear arrangement 48 transmits rotary movements and torques from the motor shaft 50 rotatable about a first rotational axis 52 to the driving shaft 46 rotatable about the first rotational axis 32. The two axes 52 and 32 may intersect each other at an angle α, preferably between and 100°, more preferably between 90° and 100°, most preferably of 90° or 97°. The bevel gear arrangement 48 may have a transmission ration of 1 or of ≠1, in particular of >1. Instead of the mechanical bevel gear arrangement 48, it would also be possible to implement a magnetic bevel gear arrangement having non-meshing magnetic gear wheels which transmit rotary movements and torques through magnetic force. Additionally or alternatively, further gear members, e.g. a coaxial gear arrangement or an epicyclic or planetary gear arrangement, may be located between the motor shaft 50 and the driving shaft 46. The alternative or additional gear members may work mechanically through meshing gear wheels or magnetically through magnetic force. Finally, it would also be possible that the motor 28 directly drives the driving shaft 46 without any gear members functionally located between the motor 28 and the driving shaft 46, wherein the driving shaft 46 would be formed by the motor shaft 50 itself.

The backing pad 30 is made of a rigid material, preferably a plastic material, which on the one hand is rigid enough to carry and support a polishing member 54 for performing the desired work on the working surface of the work piece (e.g. polishing the surface of a vehicle body, a boat or aircraft hull) during the intended use of the power tool 10 and to apply a force to the backing pad 30 and the polishing member 54 in a direction downwards and essentially parallel to the first rotational axis 32 and which on the other hand is flexible enough to avoid damage or scratching of the surface to be worked by the backing pad 30 or the polishing member 54, respectively. The polishing member 54 may comprise a foam or sponge pad, a microfiber pad, and a real or synthetic lambs' wool pad. In FIG. 1 the polishing member 54 is embodied as a foam or sponge pad. The polishing member 54 is attached to a bottom surface of the backing pad 30 in a releasable manner, e.g. by means of a hook-and-loop fastener. In the case where the power tool 10 is a sander, a sanding member would be attached to the bottom surface of the backing pad 30, the sanding member comprising a sanding pad, or a sheet-like sanding paper or fabric. The backing pad 30 and the polishing member 54 or the sanding member, respectively, preferably have a circular form.

Of course, the power tool 10 according to the present invention could also be embodied as another type of power tool, e.g. as a rotary drill, a hammer drill, a cordless screwdriver, a sanding machine, or a grinding machine, just to name a few. With other types of power tools 10, the working element may be embodied differently, e.g. as a drill chuck or the like. Furthermore, the power tool 10 could be operated pneumatically by compressed air instead of electrically by electric energy. In that case the motor 28 would be embodied as a pneumatic motor. The electric energy for operating electronic components (e.g. a controller unit, a solenoid-driven pneumatic valve, an elongated light emitting device described below or the like) of the pneumatic power tool may be provided by a dynamo which is driven by the pneumatic motor or otherwise by compressed air and/or by a rechargeable battery, which may be charged by means of a motor-driven dynamo, an external charging device or the like.

Figure 3:
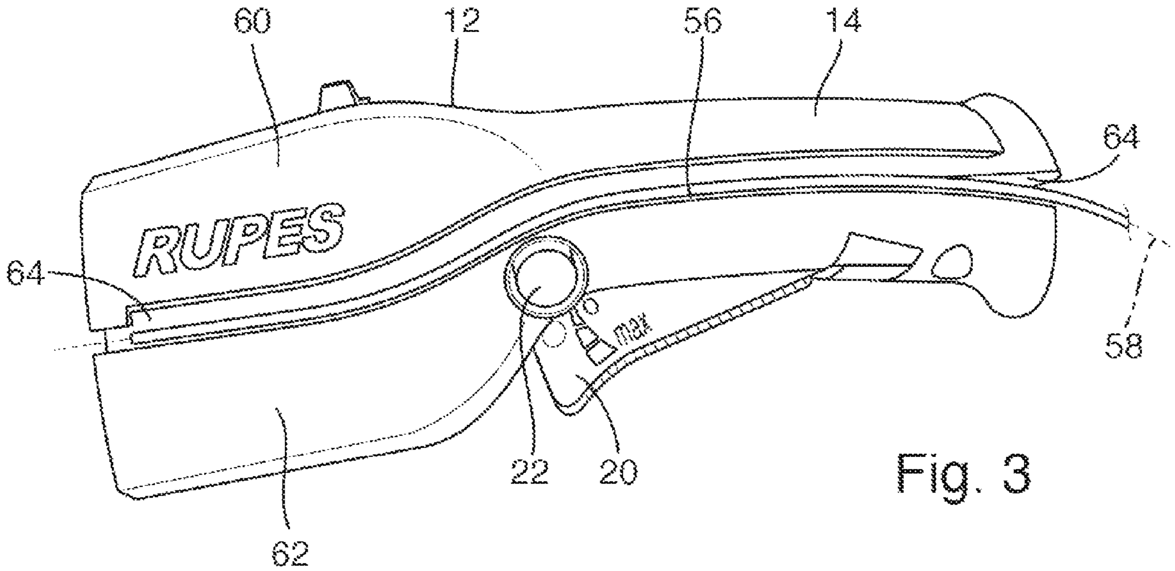
FIG. 3 a tool housing of the power tool of FIG. 1.

As can be seen in FIG. 3, it is suggested that the power tool 10 comprises at least one elongated light emitting device 56 having a longitudinal extension 58 and located at least partially on an external surface of the tool housing 12. The at least one elongated light emitting device 56 is designed to emit light along at least part of its longitudinal extension 58 in a direction that is essentially perpendicular to the longitudinal extension 58 of the elongated light emitting device 56. Preferably, the elongated light emitting device 56 emits light along its entire longitudinal extension 58. FIG. 3 shows only a single elongated light emitting device 56 located on one side of the tool housing 12. The opposite side of the tool housing 12 may be provided with another elongated light emitting device 56. Of course, one or both sides of the tool housing 12 may each be provided with more than one elongated light emitting device 56.

According to the embodiment of FIG. 3, the tool housing 12 comprises two housing shells 60, 62, which are attached to each other along a butt joint 64 during a tool housing assembly in order to form the tool housing 12. The at least one elongated light emitting device 56 extends along at least part of the butt joint 64. In FIG. 3, the elongated light emitting device 56 extends along the entire butt joint 64 between the two housing shells 60, 62. The housing shells 60, 62 may be attached to each other by means of glue, screws, snap-in connections or the like, in order to form the tool housing 12.

Figure 8:
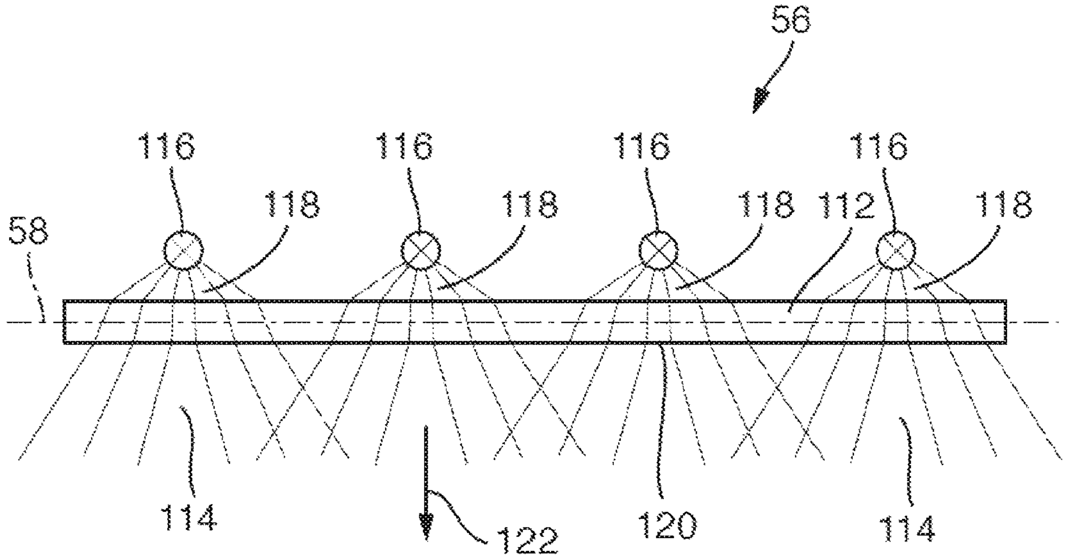
FIG. 8 yet another elongated light emitting device of a preferred embodiment of a tool housing of a hand-held power tool according to the present invention.
Figure 9:
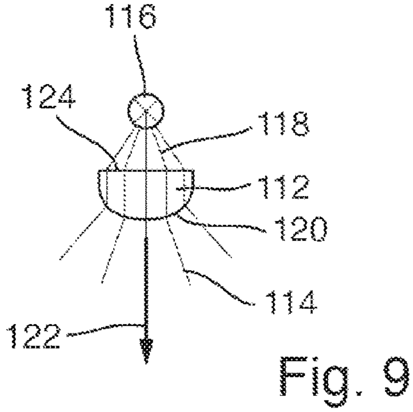
FIG. 9 the elongated light emitting device of FIG. 8 in a cross sectional view.
Figure 10:
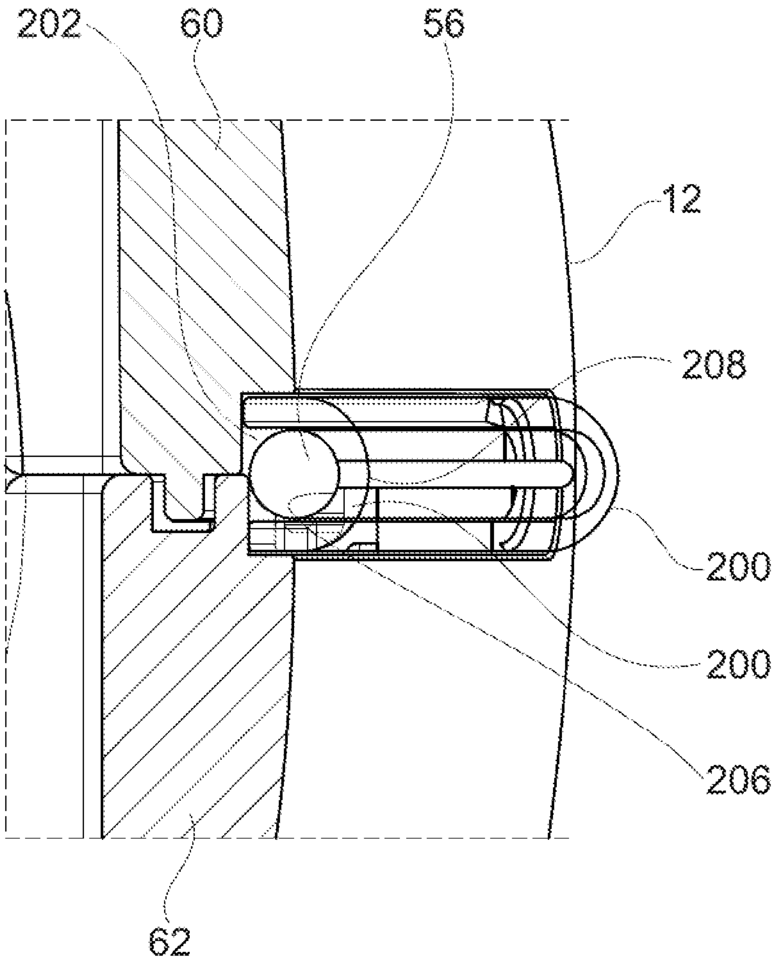
FIG. 10 a sectional view through the elongated light emitting device received in an elongated holding arrangement attached to the tool housing.

According to the invention, at least part of the elongated light emitting device 56 is received in and surrounded at least partially by at least one elongated holding arrangement 200 made of a transparent material (see FIGS. 8-10). The elongated holding arrangement 200 is adapted for being attached to the tool housing 12. As can be seen in FIG. 10, the elongated holding arrangement 200 has a U-shaped cross section. The at least one elongated light emitting device 56 is received inside an internal space 202 of the U-shape. An opening of the U-shaped elongated holding arrangement 200 is directed towards the tool housing 12 thereby closing off the internal space 2020 from the outside. Thus, the elongated holding arrangement 200 provides for a good protection of the elongated light emitting device 56.

Alternatively, the at least one elongated holding arrangement 200 has an O-shaped cross section and the at least one elongated light emitting device 56 is received inside the internal space 202 of the O-shape.

Figure 12:
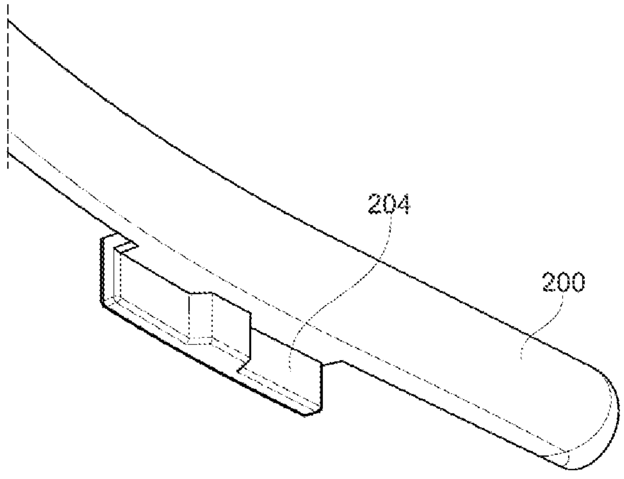
FIG. 12 a perspective partial view of the elongated holding arrangement.

As can be seen from FIG. 12, the at least one elongated holding arrangement 200 has at least two attachment elements 204 adapted for being clamped between the two housing shells 60, 62 of the tool housing 12 during the tool housing assembly. Of course, multiple other ways of attaching the elongated holding arrangement 200 to the tool housing 12 are conceivable, too, e.g. by means of a snap-in connection, a press-fit connection or glue.

The at least one elongated holding arrangement 200 is preferably made of a transparent plastic material, in particular PC or PMMA. Of course, the elongated holding arrangement 200 could be made of other suitable materials, in particular plastic materials, too.

Figure 11:
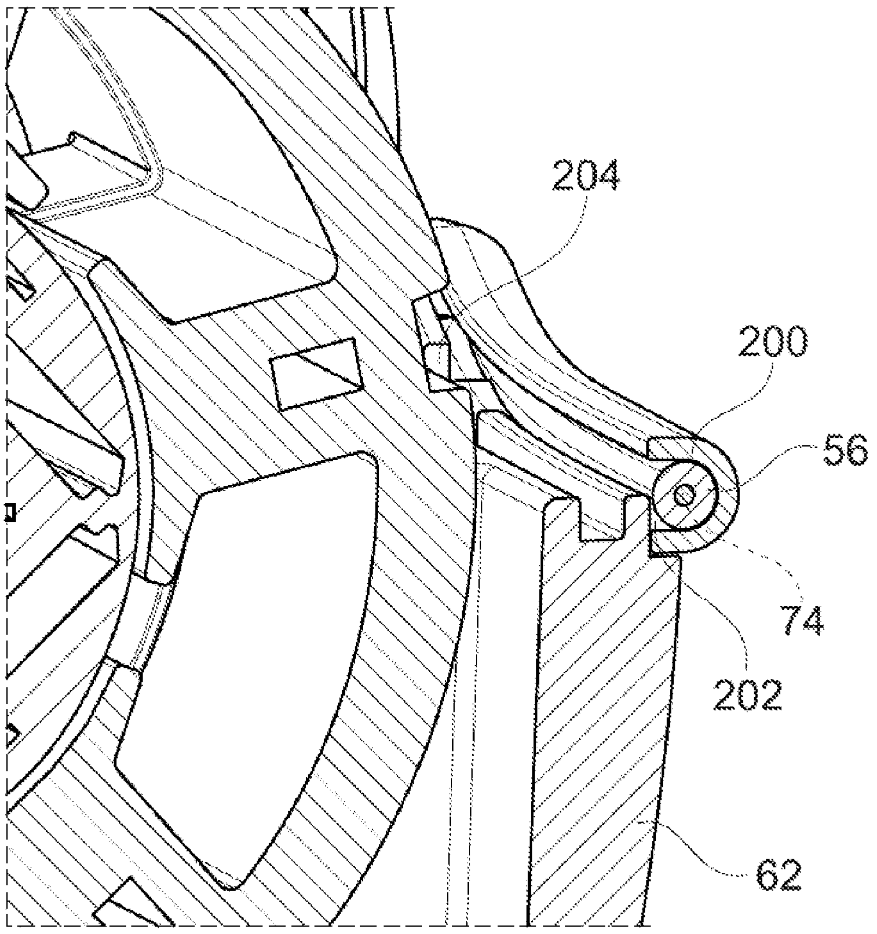
FIG. 11 a perspective sectional view through the elongated light emitting device received in the elongated holding arrangement attached to the tool housing of FIG. 10.

Preferably, the at least one elongated holding arrangement 200 is made of a rigid material which before attachment to the tool housing 12 (see FIG. 12) has a three dimensional form corresponding to the three dimensional form of that part of the tool housing 12 to which the at least one elongated holding arrangement 200 is to be attached (see FIG. 11).

It is further suggested that the at least one elongated holding arrangement 200 is made of a material and has internal and/or external light transmission surfaces 206, 208 which impose no light scattering effect on the light emitted by the at least one elongated light emitting device 56 and passing through the at least one elongated holding arrangement 200. The light emitted by the elongated light emitting device 56 is at most subject to refraction at the internal and/or external light transmission surfaces 206, 208 when passing through the elongated holding arrangement 200. However, due to the U- or O-shaped circumferential form of the elongated holding arrangement 200, and the at least partial circular curvature of the elongated holding arrangement 200 surrounding the elongated light emitting device 56, the light emitted radially outwards by the elongated light emitting device 56 passes through the elongated holding arrangement 200 even without any refraction.

Usually the butt joint 64 between the two housing shells 60, 62 forms a groove in which the elongated holding arrangement 200 with the elongated light emitting device 56 received therein can be placed. This has the advantage that the light emitting device 56 and/or the elongated holding arrangement 200 does not protrude beyond the external surface of the tool housing 12 or protrudes only slightly, which protects it from mechanical stress, in particular impacts from outside. Furthermore, the butt joint 64 usually reflects a major design line of the tool housing 12. Locating the at least one elongated light emitting device 56 (preferably by means of the elongated holding arrangement 200) along or within the butt joint 64 further emphasizes the major design line, when the light emitting device 56 emits light.

Figure 4:
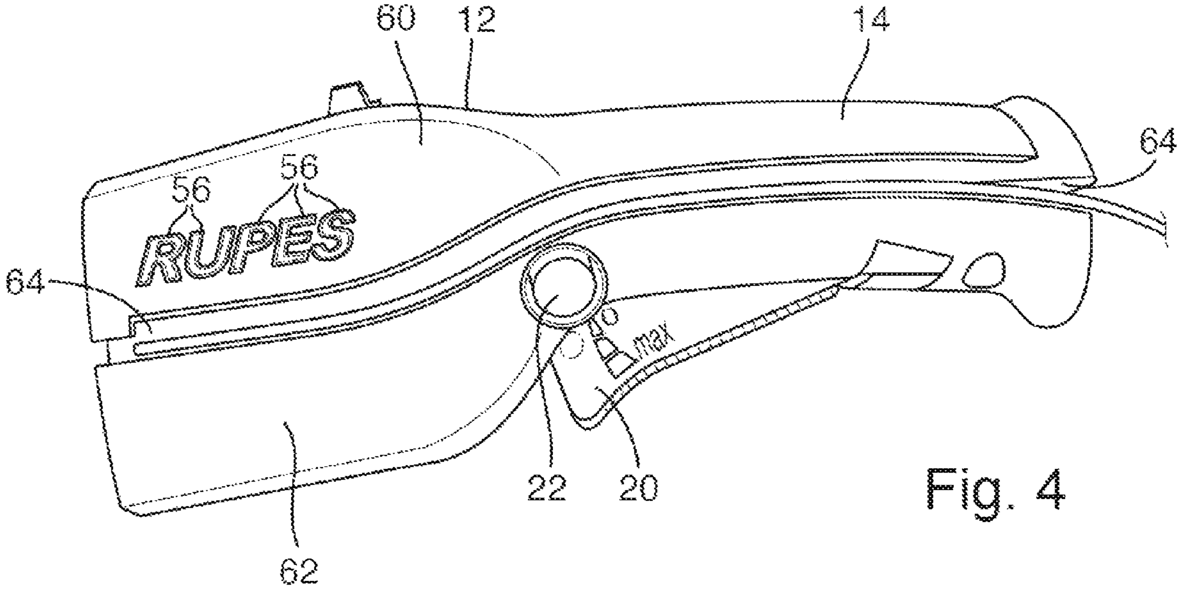
FIG. 4 a tool housing of another embodiment of a hand-held power tool according to the present invention.

According to the embodiment of FIG. 4, the tool housing 12 may comprise at least one embossed character 66 and/or at least one embossed symbol (not shown). The at least one elongated light emitting device 56 may be located in at least part of the embossed character 66 and/or the embossed symbol thereby emphasizing the character 66 or symbol when emitting light. The embossed character 66 may comprise one or more letters or numbers. In the present embodiment it comprises the name of the manufacturer of the power tool 10 (e.g. "RUPES"). Additionally or alternatively, the embossed character 66 may comprise the name of the power tool (e.g. "BigFoot"). Further, it may reflect hints or instructions for use of the power tool 10, e.g. "I/O" for indicating the positions of the on/off switch 20 or numbers from "1" to "9" or "0 . . . max" for indicating different motor speeds. The embossed symbol may comprise a graphic symbol (e.g. a paw of the BigFoot-logo) relating to the manufacturer of the tool 10 or to the model of the tool 10. By locating the elongated light emitting device 56 (preferably by means of an elongated holding arrangement) in at least part of the embossed character 66 and/or the embossed symbol these can be emphasized for better perception by an observer. Additionally, the informational aspect of the light emitted by the elongated light emitting device 56 (i.e. information on the current operating status of the power tool 10) can be combined with a design aspect emphasizing the character 66 and/or symbol embossed into the tool housing 12.

Figure 5:
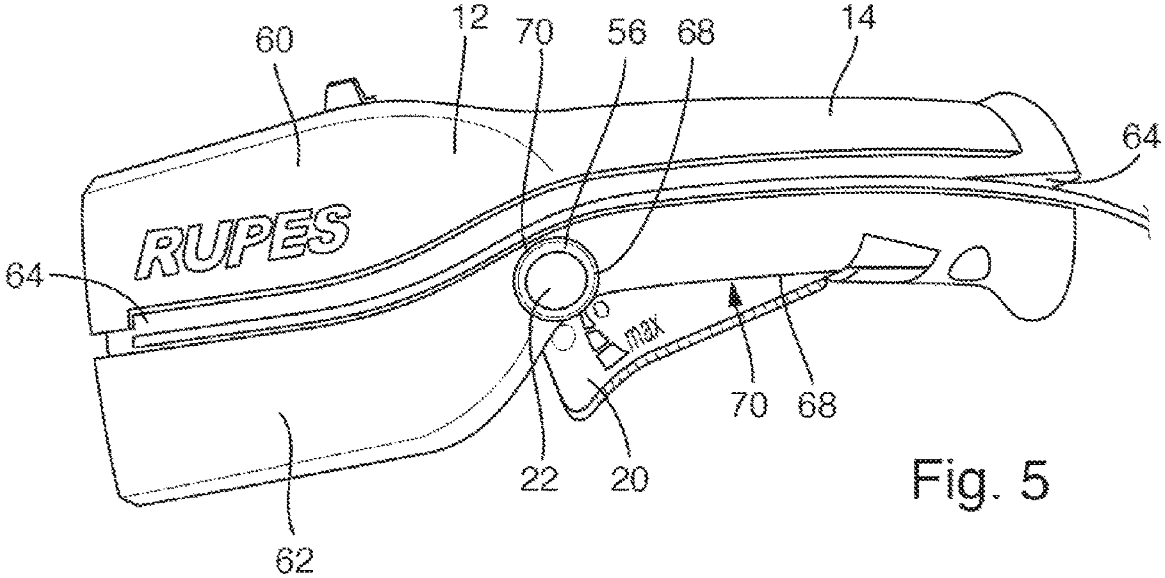
FIG. 5 a tool housing of yet another embodiment of a hand-held power tool according to the present invention.

According to the embodiment of FIG. 5, the tool housing 12 may further have one or more recesses 68, in which actuating or operating elements (e.g. switches, buttons or dials) are located in a manner movable in respect to the tool housing 12. The actuating or operating elements could be, for instance, I/O-switch 20, push button 22 or speed dial 24. The recesses 68 in the tool housing 12 and the actuating or operating elements 20, 22, 24 located in the recesses 68, leave gaps 70 between the sides of the actuating or operating elements 20, 22, 24 and the edges of the tool housing 12 defining the recesses 68. The at least one elongated light emitting device 56 may be located (preferably by means of an elongated holding arrangement) in at least part of these gaps 70 between the sides of the actuating or operating elements 22, 24 and the edges of the tool housing 12 defining the recesses 68. This makes operation of the power tool 10 and actuation of the illuminated actuating or operating elements 20, 22, 24 in dimly lit environments easier. In FIG. 5, an elongated light emitting device 56 is located only in the gap 70 around the push button 22.

The elongated light emitting device 56 can be designed in many different ways. It is suggested that the at least one elongated light emitting device 56 comprises one of

Figure 6:
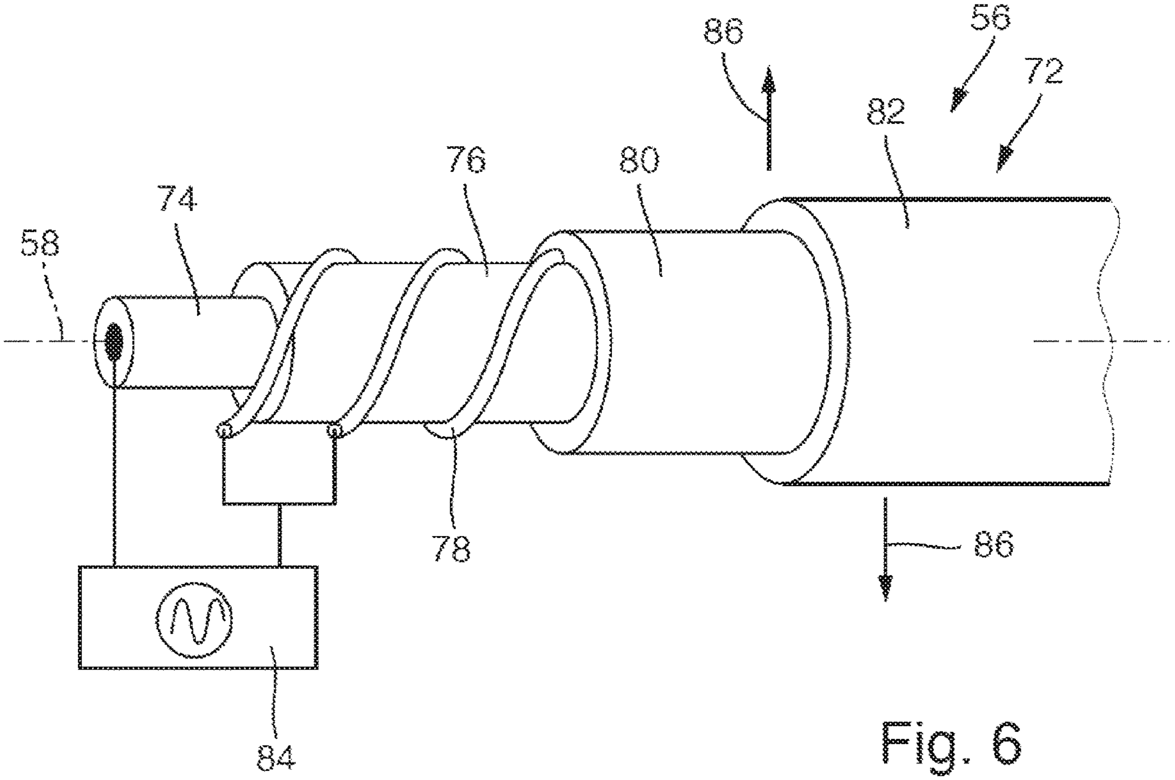
FIG. 6 an elongated light emitting device of a preferred embodiment of a tool housing of a hand-held power tool according to the present invention.

- an electroluminescent wire 72 having a longitudinal extension 58 and designed to emit light along at least part of its longitudinal extension 58 in a direction 86 that is essentially perpendicular to its longitudinal extension 58 (see FIG. 6),
- an optical light guide 88 having a longitudinal extension 58, and a light source 90 designed to emit light and to couple at least part of the emitted light 92 into the optical light guide 88, wherein the optical light guide 88 is designed to couple out at least part of the coupled-in light 94 along at least part of its longitudinal extension 58 in a direction 96 that is essentially perpendicular to its longitudinal extension 58 (see FIG. 7), and
- a diffusing lens 112 having a longitudinal extension 58, and a plurality of discrete light sources 116 located spaced apart from each other along the longitudinal extension 58 of the diffusing lens 112 and designed to emit light 118 through the diffusing lens 112 in a direction 122 that is essentially perpendicular to the longitudinal extension 58 of the diffusing lens 112, wherein the diffusing lens 112 is designed to scatter the light 118 from the discrete light sources 116 such that a light emitting side 120 of the diffusing lens 112 located opposite to the light sources 116 and extending along at least part of the longitudinal extension 58 of the diffusing lens 112 is uniformly illuminated by the scattered light 118 (see FIGS. 8 and 9).

The electroluminescent (or EL) wire 72 has a longitudinal extension 58 and is designed to emit light along at least part of its longitudinal extension in a direction 86 that runs essentially perpendicular to its longitudinal extension 58 upon activation of the EL wire 72. An example for such an EL wire 72 is shown schematically in FIG. 6. The EL wire 72 comprises a thin copper wire 74 coated by an electroluminescent material 76 (e.g. phosphor) that is surrounded by a very fine copper wire 78. Around the copper wire 78 a clear protective sheathing or sleeve 80 and surrounding that a coloured sleeve 82 (e.g. made of plastic, for example PVC, or any other kind of soft rubber) may be provided. Instead of the separated coloured sleeve 82, the protective sheathing 80 could be provided in a certain colour or with particles which alter the wavelength of the emitted light, in order to set the colour of the light emitted by the EL wire 72 to a desired value. In that case, no additional coloured sleeve 82 would be required.

When an alternating current 84 is applied to the electroluminescent material 76, it produces light through electroluminescence. The alternating current electric potential and the frequency are relatively high. The alternating current electric potential may be up to 150 V, and the frequency may be up to 7 kHz. The alternating current electric potential is preferably in the range of 90-120 V and the frequency is around 1 kHz. Of course, the electric potential and/or the frequency may have any other desired value, too. The EL wire 72 produces a 360° homogeneous unbroken line of visible light in a given colour. It has a relatively thin diameter (in the range of one or more millimetres or even thinner) which makes it highly flexible.

For installation of the EL wire 72, it has to be attached to the tool housing 12. This may be effected by gluing it to the external surface of the tool housing 12 or affix it thereto in any other way, e.g. by clamping the EL wire 72 into a groove 68 or gap 70 formed on the external surface of the tool housing 12 or between the two housing shells 60, 62.

After attachment of the EL wire 72 to the tool housing 12, preferably by means of at least on elongated holding arrangement 200, the EL wire 72 simply has to be electrically connected to a respective driver stage of a control unit of the power tool 10 located in the tool housing 12. To this end, one or more holes (not shown) can be provided in the tool housing 12 through which the EL wire 72 is led into the housing 12 and electrically connected inside the housing 12 or through which one or more electric cables (not shown) are led out of the housing 12 to the EL wire 72 and electrically connected outside the housing 12.

In order to increase the efficiency of the EL wire 72, it may be advantageous if at least part of one side of the EL wire 72 facing the tool housing 12 is assigned to a reflective surface (not shown). The reflective surface may be in the form of a coating or a foil made of a reflective material, e.g. metal. The reflective surface may be applied onto an outer boundary surface of the EL wire 72 and/or onto a part of the external surface of the tool housing 12 adjacent to the EL wire 72 and/or to a part of an internal surface 206 of the elongated holding arrangement 200. The reflective surface directs light which is emitted towards the tool housing 12 in the opposite direction away from the tool housing 12 towards an observer.

Figure 7:
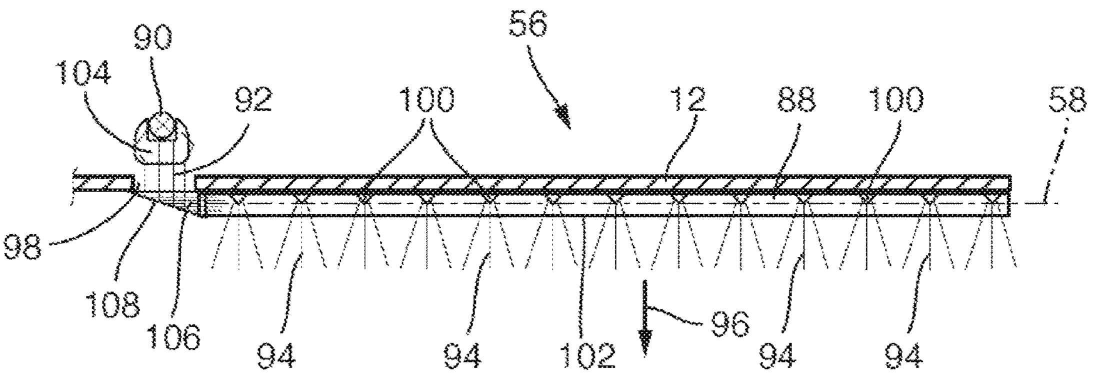
FIG. 7 another elongated light emitting device of a preferred embodiment of a tool housing of a hand-held power tool according to the present invention.

According to an alternative embodiment shown in FIG. 7, the at least one elongated light emitting device 56 comprises an optical light guide 88 which has a longitudinal extension 58 and which is assigned to at least one light source 90 designed to emit light upon its activation and to couple at least part of the emitted light 92 into the optical light guide 88. The light source 90 preferably comprises one or more light emitting devices (LEDs). The optical light guide 88 is designed to couple out at least part of the coupled-in light 94 along at least part of its longitudinal extension 58 in a direction 96 that is essentially perpendicular to its longitudinal extension 58.

The use of an optical light guide 88 has the advantage that the light source 90 may be located distant from the illuminated surface of the light guide 88, which is located at the outside of the tool housing 12. In particular, the light source 90 can be located inside the tool housing 12 where it is protected from dust, humidity, etc. Furthermore, an electric connection of the light source 90 to a battery or a power supply unit can be achieved more easily if the light source 90 is located inside the tool housing 12, preferably near the battery or the power supply unit.

In the embodiment of FIG. 7, the light source 90 is located inside the tool housing 12. One or more holes 98 can be provided in the tool housing 12 through which the light source 90 may emit light towards the optical light guide 88 located outside of the tool housing 12. Alternatively, one or both opposing ends of the optical light guide 88 may be led through the holes 98 into the inside of the tool housing 12 near the light source 90. Preferably, one or more light sources 90 couple light into the light guide 88 at one or both opposing end surfaces of the light guide 88. One or more light sources 90 may couple light into one end surface of the optical light guide 88.

The light coupled into the light guide 88 is transmitted along the longitudinal extension 58 of the light guide 88 by means of total internal reflection (TIR) at external boundary surfaces of the optical light guide 88. The optical light guide 88 is preferably solid and may be made of a glass material or a transparent plastic material, in particular of an acrylic material like polymethylmethacrylate (PMMA) or of polycarbonate (PC). These materials have a good optical clarity, good mechanical properties, and very little natural scintillation response to ionizing radiation. Due to the restricted diameter of the optical light guide 88, a light guide 88 made of the mentioned materials is flexible and, therefore, can follow the contour or design line of the power tool 10 and the tool housing 12, respectively.

The optical light guide 88 may comprise decoupling elements 100 located along at least part of the longitudinal extension 58 of the light guide 88. The decoupling elements 100 are designed to couple out at least part of the coupled-in light 94 in a direction 96 that is essentially perpendicular to the longitudinal extension 58 of the light guide 88. The decoupling elements 100 act as virtual light sources through which the light 94 is coupled out of the optical light guide 88 in the direction 96.

In the embodiment of FIG. 7, the optical light guide 88 is provided with a few individual decoupling elements 100 (having sizes in the range of millimetres) that are arranged at a relatively large distance from each other. Such an arrangement of decoupling elements 100 results in an appearance with a multitude of discrete virtual light sources for an observer. Alternatively, the optical light guide 88 could also be provided with a plurality of smaller decoupling elements (having sizes in the range of micrometres) arranged very close to each other. Such an arrangement of smaller decoupling elements creates an almost homogeneous appearance of the emitted light for the observer, so that it appears as if the entire outer boundary surface 102 of the light guide 88 was illuminated homogeneously.

The decoupling elements 100 can comprise prisms, inside the optical light guide 88 or on the outer boundary surface

102 of the light guide 88. A roughening on light reflecting surfaces of the decoupling elements 100 and/or on the outer boundary surfaces 102 of the light guide 88 through which the light 94 is coupled out of the light guide 88 can provide for an additional scattering and homogenisation of the out-coupled light 94.

In order to increase the efficiency of the elongated light emitting device 56, the decoupling elements 100 can be designed and located at or in the optical light guide 88 in such a manner as to couple out the at least part of the coupled-in light 94 into a 180°-space to one side of the optical light guide 88, preferably towards the environment surrounding the tool housing 10. In FIG. 7 the 180°-space into which the light 94 is emitted, is located below the optical light guide 88. Almost all the light coupled into the optical light guide 88 is coupled out of the light guide 88 in the direction 96 in which it can be seen by an observer. Almost no light is coupled out of the light guides 88 towards the tool housing 12, where it would not be seen by an observer.

In order to further enhance the efficiency of the elongated light emitting device 56, it is suggested that a bundling optic 104 is arranged between the light source 90 and the optical light guide 88, into which the light source 90 couples at least part of its emitted light 92. The bundling optic 104 is designed to bundle at least part of the light 92 emitted by the light source 90 and to couple a larger proportion of the emitted light 92 into the optical light guide 88 than if the bundling optic 104 was not present. It can be seen that the bundling optic 104 surrounds the light source 90 on three sides, thereby gathering a very large amount of the light 92 emitted by the light source (LED) 90 into a 180°-space adjacent to a light emitting surface of the LED 90. The bundling optic 104 focusses the light emitted by the LED 90 in a point or plane. The point or plane preferably lies on an end surface of the optical light guide 88.

In the embodiment of FIG. 7, an additional deflection element 106 is provided, which deflects the focused light 92 from the bundling optic 104 towards an end surface of the optical light guide 88. The deflection element 106 may comprise a mirror surface or as prism made of solid transparent material and having a total internal reflection (TIR) surface 108. In this embodiment, the point or plane where the bundling optic 104 focusses the light, preferably lie on the mirror surface or the TIR surface 108. Of course, the deflections element 106 could form an integral part together with the bundling optic 104 or the optical light guide 88.

The elongated light emitting device 56 may have almost any cross sectional form, including but not limited to: square, rectangular, and polygonal. However, according to a preferred embodiment, the EL wire 72 or the optical light guide 88 has a round or oval cross section. Such EL wires 72 emit light particularly homogenously. Such optical light guides 88 propagate the in-coupled light 92 by means of TIR particularly efficiently. No so-called hot spots (areas in which light rays accumulate and thus provide a particularly large brightness) are formed in such EL wires 72 or optical light guides 88.

The elongated diffusing lens 112 shown in FIGS. 8 and 9 has a longitudinal extension 58. The diffusing lens 112 may have a round, oval, square, rectangular or polygonal cross section. Preferably, the diffusing lens 112 has a cross sectional form of a segment of such a cross section, in particular of a semicircle (see FIG. 9). The diffusing lens 112 may be made of glass, a transparent plastic material or a rubber material. The diffusing lens 112 may have any colour in order to give the emitted light 114 a desired colour. The diffusing lens 112 is preferably made of a solid material. It may have a diffusing structure, e.g. a micro structure on one or more of its external surfaces through which the light 114 is transmitted. A plurality of discrete light sources 116, preferably in the form of LEDs, are arranged spaced apart from each other along the longitudinal extension 58 of the diffusing lens 112 so that they emit light 118 substantially transversely to the longitudinal extension 58 of the diffusing lens 112 there through. When passing through the diffusing lens 112, the light 118 emitted by the LEDs 116 is scattered to such an extent that a light emitting side 120 of the diffusing lens 112, which preferably extends opposite the light sources 116 over at least part of the longitudinal extension 58 of the diffusing lens 112, is uniformly illuminated. On the light emitting side 120, the discrete light sources 116 that emit the light 118 through the diffusing lens 112 are no longer recognisable. Instead, the light emitting side 120 of the diffusing lens 112 emits a homogeneous light distribution. The light emitting side 120 emits the light 114 in a direction 122 essentially perpendicular to the longitudinal extension 58 of the elongated diffusing lens 112. An optic element, similar to the bundling optic 104 of FIG. 7, may be located between one or more of the LEDs 116 and the light entry surface 124 of the diffusing lens 112. The optic element preferably broadens the light bundle emitted by the LEDs 116.

It is suggested that the at least one light source 90, 116 is designed to emit light 94, 118 of at least two different colours. Similarly, the power tool 10 may comprise at least two EL wires 72 or light sources 90, 118 which emit light 94, 114 of different colours. Preferably, the colour of the light 94, 114, 118 emitted by the at least one elongated light emitting device 56 depends on a current operation status of the hand-held power tool 10, comprising but not limited to one or more of:

- a pressure with which a user presses the working element 30 against a working surface of a work piece during intended use of the hand-held power tool 10,
- a current charge state of a battery of the hand-held power tool 10,
- a type of working movement 34 the working element 30 currently performs during intended use of the hand-held power tool 10,
- a number of rotations per time unit the working element 30 or the motor 28 currently performs during intended use of the hand-held power tool 10,
- an operating temperature inside the tool housing 12,
- whether the motor 28 is rotating or not,
- whether a battery of the hand-held power tool 10 is in proper electric contact with the electrical components of the power tool 10 or not,
- whether the motor 28 is in overload during intended use of the hand-held power tool 10, and
- an increase or a decrease of the number of rotations the working element 30 or the motor 28 currently performs during intended use of the hand-held power tool 10.

The hand-held power tool 10 may comprise control means (e.g. a switch, button, dial, etc.) accessible by the user of the power tool 10 or other people, for manually setting the colour of the light 94 emitted by the EL wire 72 or the light source 90 by a user of the power tool 10. Alternatively, the control means may comprise a radio receiver for receiving respective control signals containing information about a set colour from a mobile device, e.g. from a mobile phone or a tablet PC on which a dedicated application or computer program is executed which permits the user or other people to set the colour of the emitted light 94 to a desired value.

Additionally or alternatively, the electroluminescent wire 72 or the at least one light source 90, 116 is designed to emit light 94, 118 continuously or intermittently at a certain frequency. Preferably, whether the electroluminescent wire 72 or the at least one light source 90, 116 emits light 94, 118 continuously or intermittently and/or the frequency of the intermittently emitted light 94, 118 depends on a current operation status of the hand-held power tool 10, comprising but not limited to one or more of:

a pressure with which a user presses the working element 30 against a working surface of a work piece during intended use of the hand-held power tool 10, a current charge state of a battery of the hand-held power tool 10, a type of working movement 34 the working element 30 currently performs during intended use of the hand-held power tool 10, a number of rotations per time unit the working element 30 or the motor 28 currently performs during intended use of the hand-held power tool 10, and an operating temperature inside the tool housing 12, whether the motor 28 is rotating or not, whether a battery of the hand-held power tool 10 is in proper electric contact with the electrical components of the power tool 10 or not, whether the motor 28 is in overload during intended use of the hand-held power tool 10, and an increase or a decrease of the number of rotations the working element 30 or the motor 28 currently performs during intended use of the hand-held power tool 10.

In particular, the following ways of indicating an operating status of the power tool 10 to a user are suggested:

a battery of the power tool 10 is inserted into the tool housing 12 and properly electrically connected to electronic components of the power tool 10: the light 94, 114 emitted by the elongated light emitting device 56 turns from OFF to ON and then—possibly after a certain period of time—back from ON to OFF again, the motor 28 of the power tool 10 is running: the light 94, 114 emitted by the elongated light emitting device 56 is ON, the charging status of a battery of the power tool 10 is low: the light 94, 114 emitted by the elongated light emitting device 56 flashes with a frequency of 1 Hz, the motor 28 of the power tool 10 is overloaded: the light 94, 114 emitted by the elongated light emitting device 56 flashes with a frequency of 3 Hz, the speed of the motor 28 of the power tool 10 is increased: the light 94, 114 emitted by the elongated light emitting device 56 turns brighter for a given period of time, and the speed of the motor 28 of the power tool 10 is decreased: the light 94, 114 emitted by the elongated light emitting device 56 turns darker for a given period of time.

The invention claimed is:

1. Hand-held power tool (10), comprising a tool housing (12), a working element (30) protruding from the tool housing (12) and designed to perform a working movement (34) during an intended use of the hand-held power tool (10), and a motor (28) located inside the tool housing (12) and designed to drive the working element (30) to perform the working movement (34) during the intended use of the hand-held power tool (10), wherein at least one elongated light emitting device (56) having a longitudinal extension (58) and located at least partially on an external surface of the tool housing (12), the at least one elongated light emitting device (56) being designed to emit light along at least part of the longitudinal extension (58) in a direction (86; 96) that is substantially perpendicular to the longitudinal extension (58) of the at least one elongated light emitting device (56), the tool housing (12) comprises at least two housing shells (60, 62), which are attached to each other along a butt joint (64) during a tool housing assembly in order to form the tool housing (12), the hand-held power tool (10) further comprises at least one elongated holding arrangement (200) made of a transparent material, having an internal space (202) for receiving and surrounding at least part of the at least one elongated light emitting device (56) and adapted for being attached to the tool housing (12), and the at least one elongated holding arrangement (200) has at least two attachment elements (204) adapted for being clamped between the at least two housing shells (60, 62) of the tool housing (12) during the tool housing assembly for attachment of the at least one elongated holding arrangement (200) to the tool housing (12).

2. Hand-held power tool (10) according to claim 1, wherein the at least one elongated light emitting device (56) comprises an electroluminescent wire (72) extending along the longitudinal extension (58) and designed to emit light along at least part of the longitudinal extension (58) in a direction (86) that is substantially perpendicular to the longitudinal extension (58).

3. Hand-held power tool (10) according to claim 2, wherein the at least one elongated holding arrangement (200) has an O-shaped cross section forming an O-shape, and the at least one elongated light emitting device (56) is received inside the internal space (202) of the O-shape.

4. Hand-held power tool (10) according to claim 2, wherein the at least one elongated holding arrangement (200) has a U-shaped cross section forming a U-shape, the at least one elongated light emitting device (56) is received inside the internal space (202) of the U-shape, and the at least one elongated holding arrangement (200) is adapted to be attached to the tool housing (12) such that an opening between two approximately parallel legs of the U-shape faces towards the tool housing (12), so that the internal space (202) of the at least one elongated holding arrangement (200) is closed by the U-shape of the at least one elongated holding arrangement (200) in cooperation with the outside of the tool housing (12).

5. Hand-held power tool (10) according to claim 1, wherein the at least one elongated light emitting device (56) comprises:

an optical light guide (88) extending along the longitudinal extension (58), and a light source (90) designed to emit light (92) and to couple at least part of the light (92) emitted into the optical light guide (88), and the optical light guide (88) is designed to couple out at least part of coupled-in light (94) along at least part of the longitudinal extension (58) in a direction (96) that is substantially perpendicular to the longitudinal extension (58).

6. Hand-held power tool (10) according to claim 5, wherein the coupled-in light (92) is transmitted within the optical light guide (88) along the longitudinal extension (58) by means of total internal reflection at external boundary surfaces of the optical light guide (88); and/or the optical light guide (88) is solid; and/or the optical light guide (88) is made of a glass material or a transparent plastic material, including Polymethylmethacrylate, or Polycarbonate, or rubber.

7. Hand-held power tool (10) according to claim 5, wherein the optical light guide (88) comprises decoupling elements (100) located along at least part of the longitudinal extension (58), and the decoupling elements (100) are designed to couple out at least part of the coupled-in light (94) in a direction (96) that is substantially perpendicular to the longitudinal extension (58).

8. Hand-held power tool (10) according to claim 7, wherein the decoupling elements (100) are designed and located at or in the optical light guide (88) in such a manner as to couple out the at least part of the coupled-in light (94) into a 180°-space to one side of the optical light guide (88), including towards the environment surrounding the tool housing (12).

9. Hand-held power tool (10) according to claim 5, wherein the at least one elongated light emitting device (56) comprises a bundling optic (104) arranged between the light source (90) and the optical light guide (88), into which the light source (90) emits light (92) and couples at least part of the light (92) emitted, and the bundling optic (104) is designed to bundle at least part of the light (92) emitted by the light source (90) and to couple a larger proportion of the light (92) emitted into the optical light guide (88) than if the bundling optic (104) was not present.

10. Hand-held power tool (10) according to claim 5, wherein the light source (90) is embodied as a semiconductor light source, including a light emitting diode.

11. Hand-held power tool (10) according to claim 1, wherein the at least one elongated light emitting device (56) comprises:

a diffusing lens (112) arranged in relation to the longitudinal extension (58), and a plurality of discrete light sources (116) located spaced apart from each other along the longitudinal extension (58) and designed to emit light (118) through the diffusing lens (112) in a direction (122) that is substantially perpendicular to the longitudinal extension (58), and the diffusing lens (112) is designed to scatter the light (118) from the plurality of discrete light sources (116) such that a light emitting side (120) of the diffusing lens (112) located opposite to the plurality of discrete light sources (116) and extending along at least part of the longitudinal extension (58) is uniformly illuminated by scattered light (114).

12. Hand-held power tool (10) according to claim 1, wherein the at least one elongated light emitting device (56) extends along at least part of the butt joint (64).

13. Hand-held power tool (10) according to claim 12, wherein the colour of the light (94; 114) emitted by the light source (90; 116) depends on a current operation status of the hand-held power tool (10), comprising but not limited to one or more of the following:

a pressure with which a user presses the working element (30) against a working surface of a work piece during intended use of the hand-held power tool (10), a current charge state of a battery of the hand-held power tool (10), a type of working movement (34) the working element (30) currently performs during intended use of the hand-held power tool (10), a number of rotations per time unit the working element (30) or the motor (28) currently performs during intended use of the hand-held power tool (10), and an operating temperature inside the tool housing (12).

14. Hand-held power tool (10) according to claim 1, wherein the at least one elongated light emitting device (56) comprises a light source (90; 116) that is designed to emit light (94; 114) of at least two different colours.

15. Hand-held power tool (10) according to claim 14, wherein whether the electroluminescent wire (72) or the light source (90; 116) emits light (94; 114) continuously or intermittently and/or the frequency of the intermittently emitted light (94; 114) depends on a current operation status of the hand-held power tool (10), comprising but not limited to one or more of the following:

a pressure with which a user presses the working element (30) against a working surface of a work piece during intended use of the hand-held power tool (10), a current charge state of a battery of the hand-held power tool (10), a type of working movement (34) the working element (30) currently performs during intended use of the hand-held power tool (10), a number of rotations per time unit the working element (30) or the motor (28) currently performs during intended use of the hand-held power tool (10), and an operating temperature inside the tool housing (12).

16. Hand-held power tool (10) according to claim 1, wherein the at least one elongated light emitting device (56) comprises an electroluminescent wire (72), or a light source (90; 116) that is designed to emit light (94; 114) continuously or intermittently at a certain frequency.

17. Hand-held power tool (10) according to claim 1, wherein the at least one elongated holding arrangement (200) has an O-shaped cross section forming an O-shape, and the at least one elongated light emitting device (56) is received inside the internal space (202) of the O-shape.

18. Hand-held power tool (10) according to claim 1, wherein the at least one elongated holding arrangement (200) has a U-shaped cross section forming a U-shape, the at least one elongated light emitting device (56) is received inside the internal space (202) of the U-shape, and the at least one elongated holding arrangement (200) is adapted to be attached to the tool housing (12) such that an opening between two approximately parallel legs of the U-shape faces towards the tool housing (12), so that the internal space (202) of the at least one elongated holding arrangement (200) is closed by the U-shape of the at least one elongated holding arrangement (200) in cooperation with the outside of the tool housing (12).

19. Hand-held power tool (10) according to claim 1, wherein the at least one elongated holding arrangement (200) is made of a transparent plastic material, comprising where the at least one elongated holding arrangement (200) is made of PC or PMMA.

20. Hand-held power tool (10) according to claim 1, wherein the at least one elongated holding arrangement (200) is made of a rigid material which before attachment to the tool housing (12) has a rigid three-dimensional form corresponding to the three-dimensional form of a part of the tool housing (12) to which the at least one elongated holding arrangement (200) is to be attached.

* * * * *